UNITED STATES PATENT OFFICE.

FRITZ ACH, OF MANNHEIM, GERMANY, ASSIGNOR TO C. F. BOEHRINGER & SOEHNE, OF WALDHOF, GERMANY.

PROCESS OF MAKING ALKYL-URIC ACID.

SPECIFICATION forming part of Letters Patent No. 654,121, dated July 24, 1900.

Application filed October 28, 1899. Serial No. 735,087. (No specimens.)

*To all whom it may concern:*

Be it known that I, FRITZ ACH, a citizen of the German Empire, residing at Mannheim, in the German Empire, have invented certain new and useful Improvements in the Preparation of Alkyl-Uric Acids; and I do hereby declare the following to be a full, clear, and exact description of the invention, such as will enable others skilled in the art to which it appertains to make and use the same.

The present invention relates to the manufacture of alkyl derivatives of uric acid.

In my Letters Patent of the United States, No. 631,761, dated August 22, 1899, a method has been described which enables one to readily obtain uric acids having a methyl group bound to the nitrogen atom in the position 7 of the purin-molecule:

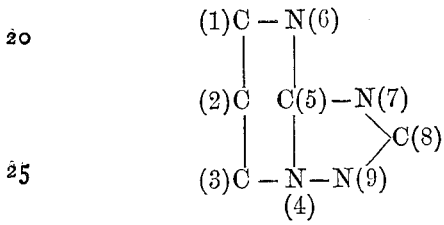

This is done according to that application by subjecting the monoformaldehyde or oxymethylene compounds of uric acid, whose nature and method of preparation have been described in German Patent No. 102,158 and in the application of myself and Lorenz Ach for Letters Patent, Serial No. 678,331, filed April 21, 1898, to the action of reducing agents which cause the oxymethyl group in said oxymethylene compounds to be reduced to a methyl group, according to the equation:

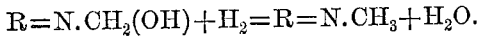

Now I have found as the result of further experiments in this direction that it is not necessary to start with the completely-formed monoformic aldehyde compounds of uric acid or its alkyl derivatives in order to prepare 7-methyluric acid or its homologues or alkyl derivatives, but that I may dispense with such formaldehyde compounds and start directly with a uric acid—such, for example, as uric acid proper—provided I submit the same to the action of reducing agents in the presence of formaldehyde. Under these conditions the formation of the oxymethylene compounds and their reduction to the desired alkyl-uric acid take place in the course of one and the same operation.

My invention therefore, broadly considered, consists in preparing 7-methyl-uric acid or an alkyl derivative thereof by subjecting a uric acid, such as uric acid proper, directly to the action of a reducing agent in the presence of formic aldehyde.

My invention also consists in such further features, steps, and methods as will be hereinafter set forth, and pointed out in the claims.

In illustration of my new invention and to set forth the preferred manner of carrying out my process I will describe two examples embodying my said invention.

1. *Preparation of 7-methyl-uric acid from uric acid proper.*—To forty parts, by volume, of concentrated hydrochloric acid I add six parts, by volume, of a forty-per-cent. solution of formic aldehyde, and the whole at a temperture of zero centigrade is then saturated with hydrochloric-acid gas. Into the solution thus prepared I introduce five parts, by weight, of uric acid proper and fifteen parts, by weight, of granular tin. The resultant reducing action is at first allowed to proceed at a temperature of zero (0°) degrees centigrade for, say, a period of about twenty-four hours and while submitting the whole to continuous stirring or agitation. After the completion of this treatment the whole is heated to from 80° to 90° centigrade and maintained at this temperature for about twelve hours. This liquid, while still hot, is then diluted with from an equal to one and one-half times its volume of warm water (having a temperature of 80° to 90° centigrade) and then filtered to separate it from any unused tin and undissolved uric acid, and it is then allowed to cool. The greater portion of the 7-methyl-uric acid which has been formed is thereby thrown out crystallized in the form of shining needles and in an almost-pure condition. The balance of the 7-methyl-uric acid is then obtained by draining the crystals on the filter and evaporating the filtrate to drive off the hydrochloric acid, the evaporation being continued until the filtrate has attained a syruppy consistency. This syruppy mass is then taken up with water of a temperature of 30° to 40° centigrade. Upon cooling the balance of the 7-methyl-uric acid crystallizes out of the solution, as above. The reactions in this process proceed according to the equations:

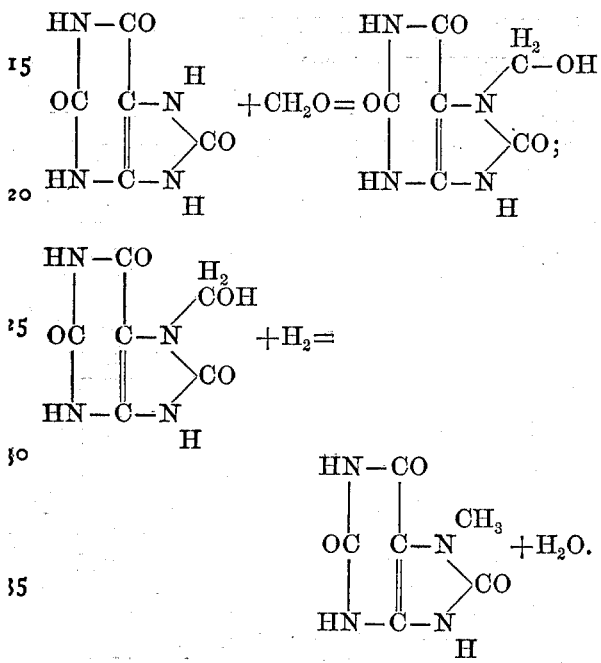

2. *Preparation of 3-7-dimethyl-uric acid from 3-methyl-uric acid.*—I take ten parts, by weight, of 3-methyl-uric acid and I pour over the same a mixture of one hundred parts, by volume, of concentrated hydrochloric acid of a specific gravity 1.19 and five parts, by volume, of forty-per-cent. formic aldehyde. To the whole are added forty parts, by weight, of granular tin, and the whole is then first continuously and well stirred or agitated for from six to seven hours at ordinary room temperature, and thereupon its temperature is raised to from 70° to 80° centigrade and maintained for about three hours more, the stirring or agitation being continued. By this means the reduction is completed. The liquor is then diluted with about twice its volume of water, and the whole is then allowed to cool. The resultant 3-7-dimethyluric acid is then separated from the tin mixed with the same by boiling the whole with dilute ammonia, (two-per-cent. strength,) and the solution thus obtained is then treated with a purifying agent, such as animal charcoal, whereupon it is acidulated with a proper acid, such as sulfuric acid, whereby the dimethyl-uric acid is obtained in a pure condition. The process takes place according to the equations:

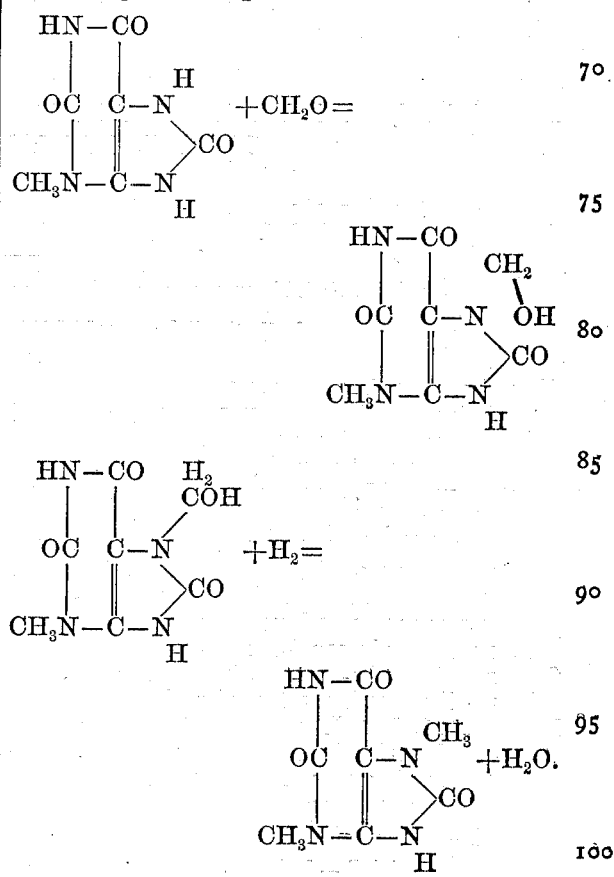

What I claim, and desire to secure by Letters Patent, is—

1. The process of preparing a methyl-uric acid or its alkyl derivative which consists in subjecting a uric acid to the action of a reducing agent in the presence of free formic aldehyde.

2. The process which consists in submitting uric acid proper to the action of a reducing agent in the presence of formic aldehyde.

3. The process which consists in adding to a uric acid together with a mineral acid free formic aldehyde and tin.

4. The process which consists in adding to a uric acid together with hydrochloric acid a solution of free formic aldehyde and tin.

5. The process which consists in adding a solution of formic aldehyde and hydrochloric acid to uric acid and tin and maintaining the whole at a low temperature and then raising the temperature.

6. The process which consists in adding together uric acid, hydrochloric acid and a solution of formic aldedyde and tin and maintaining the whole at a low temperature, then raising the temperature and maintaining the whole at such temperature and finally diluting the whole and allowing the same to cool.

7. The process which consists in preparing a solution of formic aldehyde in saturated hydrochloric acid, adding to the same uric acid and tin and maintaining the whole at a low temperature while stirring, then heating to an
5 elevated temperature and maintaining at such temperature and finally diluting the whole and allowing to cool, substantially as described.

In testimony whereof I affix my signature in presence of two witnesses.

FRITZ ACH.

Witnesses:
  LORENZ ACH,
  JACOB ADRIAN.